United States Patent [19]

Yarger et al.

[11] Patent Number: 5,190,782
[45] Date of Patent: Mar. 2, 1993

[54] ACYLATED AMINO ACID ESTER DERIVATIVES AS LOW CALORIE FAT MIMETICS

[75] Inventors: Ronald G. Yarger, Convent Station; Lawrence P. Klemann, Somerville; John W. Finley, Whippany, all of N.J.

[73] Assignee: Nabisco, Inc., Parsippany, N.J.

[21] Appl. No.: 690,732

[22] Filed: Apr. 24, 1991

Related U.S. Application Data

[63] Continuation-in-part of Ser. No. 409,254, Sep. 19, 1989, abandoned.

[51] Int. Cl.$^5$ .................................................. A23L 1/29
[52] U.S. Cl. ...................................... 426/531; 426/549; 426/601; 426/602; 426/611; 426/804
[58] Field of Search ............... 426/531, 549, 601, 602, 426/611, 804, 660; 260/404; 560/191, 125, 155

[56] References Cited

FOREIGN PATENT DOCUMENTS 2111361 9/1927 Fed. Rep. of Germany .
46027473 8/1971 Japan .

OTHER PUBLICATIONS

Kunitake et al. Mem. Fac. Eng. Kyushu Univ. vol. 46 (2) pp. 221-243 Feb. 1986.

*Primary Examiner*—Joseph Golian
*Assistant Examiner*—Evan Federman

[57] ABSTRACT

Acylated amino acid ester derivatives are disclosed as fat mimetic compounds for reduced calorie food compositions. These compounds are derived from amino acids and contain one amino group acylated with a fatty acid or fatty acid derivative, one carboxylic group esterified with a fatty alcohol or a fatty alcohol derivative, and, optionally, a free or derivatized amino acid side chain. Many of the compounds can be represented by the following formula:

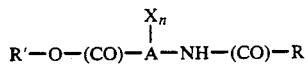

$$R'-O-(CO)-A-NH-(CO)-R$$

where A is a hydrocarbyl group derived from an amino acid, X is a free or derivatized amino acid side chain, n is 0 or 1, and R and R' are aliphatic, ether or ester groups. Preferred compounds have one side chain and are partially digestible, achieving reduced caloric value and reducing problems associated with non-metabolizable fat substitutes.

23 Claims, No Drawings

ACYLATED AMINO ACID ESTER DERIVATIVES AS LOW CALORIE FAT MIMETICS

RELATED APPLICATION DATA

This is a continuation-in-part of U.S. patent application Ser. No. 07/409,254 filed Sep. 19, 1989, now abandoned.

BACKGROUND OF THE INVENTION

The present invention relates to the use of acylated amino acid ester derivatives as a new class of edible, preferably partially digestible, fat mimetics.

Many foods which provide gustatory satisfaction contain significant fat levels, yet fats provide nine calories per gram compared to four calories per gram provided by protein and carbohydrates. Dietary fats represent approximately 40 to 45% of the U.S. daily caloric intake, significantly more than England, which has the same daily food consumption, and the percentage has risen since 1936 (Merten, H. L., J. Agr. Food Chem. (1970) 18, 1002–1004). A large number of national advisory committees on nutrition have made recommendations differing in detail, but the common theme is a reduction in the total amount of fat in our diet for medical and health reasons, for both individuals who desire a caloric reduction and those who do not (Gottenbos, J. J., chapter 8 in Beare-Rogers, J., ed., Dietary Fat Requirements in Health and Development, A.O.C.S. 1988, page 109). Hence, major research efforts have focused on ways to produce food substances that provide the same functional and organoleptic properties as fats, but not the calories.

A major strategy for developing low calorie replacement fats has been to structurally re-engineer natural triglycerides in such a way as to retain their conventional functional properties in foods, while removing their susceptibility toward hydrolysis or subsequent absorption during digestion. To this end, the the fatty acids attached to glycerol have been replaced with alternate acids (U.S. Pat. No. 3,579,548 to Whyte); groups have been inserted between the fatty acids and the glycerol backbone (e.g., ethoxy or propoxy groups, U.S. Pat. No. 4,861,613 to White and Pollard); the ester linkages have been replaced by ether linkages (U.S. Pat. No. 3,818,089 to Bayley and Carlson, and Can. Pat. No. 1,106,681 to Trost); the ester linkages have been reversed (U.S. Pat. No. 4,508,746 to Hamm); and the glycerol moeity has been replaced with an alternate alcohol (e.g., ethylene glycol in U.S. Pat. No. 2,924,528 to Barskey et al., and U.S. Pat. No. 2,993,063 to Alsop and Carr).

A second major approach to the development of a low calorie fat replacement has been to explore or synthesize nonabsorbable polymeric materials structurally unlike triglycerides, but having physical properties similar to edible fat. Mineral oil was disclosed as early as 1894 (U.S. Pat. No. 519,980 to Winter), and, more recently, polydextrose (U.S. Pat. No. 4,631,196 to Zeller), polyglucose and polymaltose (U.S. Pat. No. 3,876,794 to Rennhard), polysiloxane (Eur. Pat. Ap. No. 205,273 to Frye), jojoba wax (W. Ger. Pat. No. 3,529,564 to Anika), polyethylene polymers (E. Ger. Pat. No. 207,070 to Mieth, et al.), polyoxyalkylene esters (U.S. Pat. No. 4,849,242 to Kershner), polyvinyl alcohol esters (U.S. Pat. No. 4,915,974 to D'Amelia and Jacklin), and polymerized $C_{18}$ fatty acid ethyl esters (U.S. Pat. No. 4,980,191 to Christensen) have been suggested.

A third major strategy combines the first two. Rather than restructure triglyceride molecules or find a substitute structurally very dissimilar, this approach explores the use of various polyol esters, compounds which have numbers of fatty acid groups in excess of the three in conventional fat triglycerides, as nonabsorbable fat replacements. Fully esterified sugar alcohols were suggested as fat replacements during World War I (notably mannitol, Lapworth, A., and Pearson, L. K., and Halliburton, W. D., et al., J. Biol. Chem. (1919) 13, 296–300 and 13, 301–305); Minich suggested esterifying pentaerythritol, a tetrahydric neopentyl sugar alcohol which can be formed from pentaerythrose, in 1960 (U.S. Pat. No. 2,962,419); and the Southern and Western Regional Research Laboratories of the U.S.D.A. investigated the feasibility of using amylose esters as new-type fats during the 1960's (see Booth, A. N., and Gros, A. T., J. Amer. Oil Chem. Soc. (1963) 40, 551–553 and the references cited therein). More recently, sucrose polyesters (U.S. Pat. No. 3,600,186 to Mattson and Volpenhein) and other acylated sugars (U.S. Pat. No. 4,840,815 to Meyer, et al.) have been suggested. The caloric availability and digestibility of a series of dimeric and polymeric glycerides including diglyceride esters of succinic, fumaric, and adipic acids, and polymeric fats from stearic, oleic and short-chain dibasic acids were assessed by the U.S.D.A. group cited supra, and polyglycerol esters have since been suggested (U.S. Pat. No. 3,637,774 to Babayan and Lehman).

Nondigestible or nonabsorbable edible fat replacements have proved disappointing when tested in feeding trials, where gastrointestinal side effects occurred, in some cases so extreme that frank anal leakage was observed (for recent reviews, see Hamm, D. J., J. Food Sci. (1984) 49, 419–428, Haumann, B. J., J. Amer. Oil Chem. Soc. (1986) 63, 278–288, and LaBarge, R. G., Food Tech. (1988) 42, 84–89). Nondigestible fats appear to act as a laxative and are expelled from the body, eliciting foreign body reactions like those early documented for mineral oil (Stryker, W. A., Arch. Path. (1941) 31, 670–692, more recently summarized in Goodman and Gilman's Pharmacological Basis of Therapeutics, 7th ed., Macmillan Pub. Co., N.Y. 1985, pp. 1002–1003). In the U.S.D.A.,s assessment of the caloric availability and digestibility of a series of new-type fats in the 1960's (e.g., amylose fatty acid esters, diglyceride esters of succinic, fumaric, and adipic acids, and polymeric fats from stearic, oleic and short-chain dibasic acids; see Booth, A. N., and Gros, A. T., cited above), rats fed the experimental fats exhibited undesirable gastrointestinal side effects similar to what had already been observed with mineral oil consumption by people. In several of the balance studies, the diarrhea was so extreme that digestibility coefficients could not be calculated in the trial feedings (ibid., Table 1, p. 552).

Polyglycerol and polyglycerol esters, suggested as fat replacements by Babayan and Lehman (cited above), have been suggested for use as fecal softening agents as well (U.S. Pat. No. 3,495,010 to Fossel). A number of remedies have been recommended to combat the anal leakage observed when sucrose polyesters are ingested (e.g., employing cocoa butters, U.S. Pat. No. 4,005,195 to Jandacek, incorporating saturated fatty groups, Eur. Pat. Ap. No. 233,856 to Bernhardt, or mixing residues, U.S. Pat. No. 4,797,300 to Jandacek, et al.). Saturated fatty acids have been disclosed as anti-anal leakage agents for polyorganosiloxane fat substitutes (U.S. Pat. No. 4,925,692 to Ryan), and dietary fiber preparations have been incorporated into foodstuffs containing other fat replacements to help inhibit the diarrheal effect (U.S. Pat. No. 4,304,768 to Staub et al. and Eur. Pat. Ap. No. 375,031 to DeBoer and Kivits). Partially digestible fat replacements have also been suggested (U.S. Pat. No. 4,830,787 to Klemann and Finley; U.S. Pat. No. 4,849,242, cited above; and U.S. Pat. No. 4,927,659 to Klemann, et al.).

SUMMARY OF THE INVENTION

An object of the present invention is to provide a new group of reduced calorie fat replacement compounds, members of which are compatible with normal digestion. More particularly, it is an object of a preferred embodiment of the present invention to provide a partially digestible fat replacement which minimizes or avoids diarrhea and other laxative side effects. It is a further object of a preferred embodiment of the present invention to provide a partially digestible fat replacement which may, if desired, be engineered to provide essential or desirable fatty acids.

These and other objects are accomplished by the present invention, which describes acylated amino acid derivatives comprising a new class of edible fat mimetics, methods of using them, and food compositions employing them. The compounds of this invention have one amino group acylated with a fatty acid derivative, one carboxylic group esterified with a fatty alcohol derivative, and, optionally, a free or derivatized amino acid side chain. Many of the compounds may be described by the following formula:

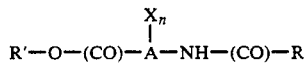

where
A = a hydrocarbyl group having 1 to 6 carbons,
X = a free or derivatized amino acid side chain having 1 to 25 carbons,
n = 0 or 1,
each R is, independently, a $C_1$ to $C_{29}$ aliphatic group, a $C_2$ to $C_{29}$ ether of the formula R"—O—R"'—, or a $C_2$ to $C_{29}$ ester group of the formula R"'—O—(CO)— R"— or R"—(CO)—O—R"'—, where R"— and R"'— are, independently, aliphatic groups, and
each R' is, independently, a $C_1$ to $C_{30}$ aliphatic group, a $C_2$ to $C_{30}$ ether of the formula R"—O—R"'—, or a $C_2$ to $C_{30}$ ester group of the formula R"'—O—(CO)— R"— or R"—(CO)—O—R"'—, where R"— and R"'— are, independently, aliphatic groups.

Preferred compounds are partially digestible and have three side chains: the acylated amino group, the esterified carboxylic group, and a third, which may be a second acylated amino group, a second esterified carboxylic group, or the free or acylated side chain of the amino acid comprising the compound backbones.

DETAILED DESCRIPTION OF THE INVENTION

Fatty acid derivatives have been condensed with amino acids to form adducts for use as surfactants, notably as textile treatments (U.S. Pat. No. 2,015,912 to Sommer (1935); U.S. Pat. No. 2,729,657 to Krems (1956); W. Ger. Pat. No. 961,799 to Gutmann et al. (1958); W. Ger. Pat. No. 1,091,278 to Gutmann and Linke (1960); and W. Ger. Pat. No. 1,130,408 to Linke et al. (1962)), but also as wetting and dispersing agents in other compositions, including detergents (Gt. Brit. Pat. No. 1,483,500 to Ajinomoto (1975); U.S. Pat. No. 4,273,684 to Nagashima et al. (1981); U.S. Pat. No. 4,478,734 to Ogino et al. (1984); and Jap. Pat. No. 54,039,408 (1979)) and cosmetics (U.S. Pat. No. 3,969,087 to Saito et al. (1976), Jap. Pat. No. 55,129,141 (1981) and U.S. Pat. No. 4,400,295 to Ootsu (1983)). Fatty acid-amino acid adducts that are N-acyl (fatty acid) derivatives are most common (see, for example, Jungermann, E., et al. J. Amer. Chem. Soc. (1956) 78, 172-174 and U.S. Pat. Nos. 3,766,266 to Wakamatsu et al. (1973)), for the derivatives have been used as soap softeners and in adhesive compositions (U.S. Pat. No. 4,075,830 to Nagasawa and Okitsu (1978)), and the salts, in metal working and metal capturing compositions (W. Ger Pat. No. 2,139,839 to Inazuka et al. (1972) and U.S. Pat. No 3,945,931 to Bussi and Baradel (1976)) and in dentifrices (U.S. Pat. No. 2,689,170 to King (1954) and Jap. Pat. No. 54,011,242 (1979)).

However, acylation of both the amino and carboxylate functionalities of amino acids has also been carried out to yield complex fatty amide-ester compounds for use in shampoos, paints, oil recovery from polluted waters, and metal chelants (see the discussion in U.S. Pat. No. 4,264,515 to Stern et al., col. 1, lines 21 to 36). Members of this class of structures have also been suggested for use as antibacterial surfactants (Marhnouj, L., et al., Ann. Pharm. Fr. (1981) 39, 503-510 (1981)) and as neoplasm inhibitors (Straukas, J., et al., Izuch. Funkts. Kletki (1981) 41-53). Amino acids have also been condensed with monoglycerides to form surface-active compounds (Horikawa, K., et al., Kagaku To Kogyo (Osaka) (1977) 51, 281-286) and ethane diol esters to study as models for microbial membranes (Prabhudesai, A. V., and Viswanathan, C. V., Chem. Phys. Lipids (1978) 22, 71-77). The compounds are said to possess antimicrobial and antiviral as well as detergent properties, ibid. at 72), and short peptides have been N-acylated with fatty acids (to investigate surface films in Koebner, A., J. Chem. Soc. (1941) 564-566; to inhibit fungus growth in Yukalo, V. G., et al., Prikl. Biokhim. Mikrobiol. (1984) 20, 236-238; and to induce antibodies (Jap. Pat. No. 60,155,119 (1985)).

This invention is based on the finding that N-acylated amino acid ester derivatives are useful as edible fat replacements in foods and pharmaceuticals. The N-acylated amino acid ester compounds of this invention are amino acid amide esters, N-acylated with fatty acids or fatty acid derivatives, and esterified with fatty alcohols or fatty alcohol derivatives. Many compounds also have free or derivatized side chains and can be defined by the following structural formula:

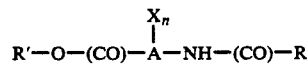

where
A = a hydrocarbyl group having 1 to 6 carbons,
X = a free or derivatized amino acid side chain having 1 to 25 carbons,
n = 0 or 1,
each R is, independently, a $C_1$ to $C_{29}$ aliphatic group, a $C_2$ to $C_{29}$ ether of the formula R"—O—R"'—, or a $C_2$ to $C_{29}$ ester group of the formula $R'''—O—(CO)—R''—$ or $R''—(CO)—O—R'''—$, where $R''—$ and $R'''—$ are, independently, aliphatic groups, and each $R'$ is, independently, a $C_1$ to $C_{30}$ aliphatic group, a $C_2$ to $C_{30}$ ether of the formula $R''—O—R'''—$, or a $C_2$ to $C_{30}$ ester group of the formula $R'''—O—(CO)—R''—$ or $R''—(CO)—O—R'''—$, where $R''—$ and $R'''—$ are, independently, aliphatic groups.

Preferred compounds are those with one side chain, i.e., those having $n=1$.

The compounds of this invention are amino acid derivatives, amino acids which have one amino group acylated with a fatty acid or fatty acid derivative and one carboxylate group esterified with a fatty alcohol, or derivative, to yield a compound having one amide ($—NH—(CO)—R$) and one carboxylate ester ($—O—(CO)—R'$) functionality. Preferred compounds of this invention, however, have three side chains: one R group in amide linkage, one $R'$ linked as a carboxylate ester, and one X free or derivatized amino acid side chain. X can be a second esterified carboxylate (of the formula $—O—(CO)—R'$, where $R'$ is independent of the $R'$ in the other ester), a second acylated amine (of the formula $—NH—(CO)—R$, where R is independent of the R in the other amide), an alkyl, an acylated hydroxyl or thiol, or the like.

The term "amino acid" as used herein means an organic compound possessing both a carboxylic ($—COOH$) and an amino ($—NH_2$) group, compounds represented by the general formula:

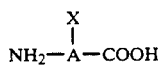

where A is an amino acid backbone, a hydrocarbyl group. Among the amino acids which may be employed as compound starting materials to contribute hydrocarbyl group A are the twenty common, naturally occurring amino acids, alanine, arginine, asparagine, aspartic acid, cysteine, glutamine, glutamic acid, glycine, histidine, isoleucine, leucine, lysine, methionine, phenylalanine, proline, serine, threonine, trypotophan, tyrosine, and valine. However, the compounds of this invention may be made with other amino acids, ornithine and citrulline, for example, or any other natural or synthetic amino acid having the amino group in the alpha- position, as in common amino acids, or in the beta-, gamma-, delta-, or epsilon-positions. Thus, compounds of this invention may be derived from cystine, alpha- or beta-alanine, alpha- or gamma-aminobutyric acid, alpha-aminopimelic or alipha-, epsilondiaminopimelic acid, and so forth. Typical A groups are aliphatic and have one to six carbon atoms. Chemical descriptions and formulae used herein include isomeric variations.

The compounds of this invention may have a side chain, X, having 1 to 25 carbon atoms, which is free or derivatized. By "amino acid side chain" is meant a group derived from the natural or synthetic amino acid forming the compound backbone. X may be a branched or straight chain alkyl, alkenyl, aryl, or aralkyl group having 1 to 25 carbons (for example, methyl, isopropyl, isobutyl, n-hexadecyl, oleyl, benzyl, indolyl, tosyl); a free hydroxyl, amine, or thiol attached to A with or without intervening carbons, such as, for example, $—CH_2OH$, $—CH(OH)—CH_3$,

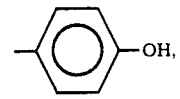

$—CH_2SH$, $—(CH_2)_4—NH_2$, or $—CH_2(CO)NH_2$), or an acylated side chain formed by acylating a side chain bearing a hydroxyl, thiol, or amine group with a fatty acid or a fatty acid derivative; or a carboxylate attached to A with or without intervening carbons, such as, for example, $—CH_2—COOH$, $—CH_2CH_2—COOH$, or a carboxylate ester side chain formed by esterifying a carboxylate with a fatty alcohol or fatty alcohol derivative. Where X groups are acylated or esterified with fatty R or $R'$ groups, these groups are independent of the amino acid R and $R'$ groups attached to A in amide and ester linkage.

Broadly speaking, the amino acid derivatives of this invention include acylated amino acid esters having no side chains (i.e., $n=0$) such as, for example, fatty alcohol N-acylated glycine fatty acid esters. The acylated amino acid esters of this invention further include derivatives having an aliphatic side chain. These compounds may be defined by the formula

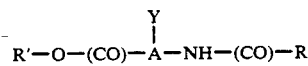

where

Y is a $C_1$ to $C_{25}$ aliphatic group and A, R, and $R'$ are as defined above.

This group includes derivatives an alkyl Y group such as, for example, fatty acid acylated, fatty alcohol esters of alanine, leucine, aminobutyric, isoleucine, and valine. Related to these are amino acid derivatives having one esterified carboxylate, one acylated amine, and an aromatic side chain such as phenylalanine derivatives.

The compounds of this invention include derivatives having two N-acyl groups, such as, for example, fatty acid acylated, fatty alcohol esters of arginine, glutamine, and histidine.

This group also includes compounds of the formula

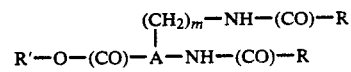

where $m=0$ to 9,

A, R, and $R'$ are as defined above, the R groups being the same or different, such as, for example, fatty acid acylated, fatty alcohol esters of lysine, ornithine, diaminobutyric acid, diaminopentanoic acid, and the like.

The compounds of this invention also include derivatives bearing an acylated hydroxyl or sulfhydryl group in addition to an acylated amine and an esterified carboxylate, such as, for example, fatty acid acylated, fatty alcohol esters of threonine and cysteine. This group includes compounds of the formula

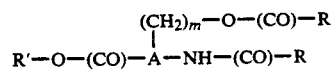

where $m=0$ to 9, and

A, R, and R' are as defined above, the R groups being the same or different, such as, for example, fatty acid acylated, fatty alcohol esters of serine, aminohydroxybutyric acid, aminohydroxypentanoic acid, and the like.

The compounds of this invention further include derivatives having two esterified carboxylate groups, such as, for example, fatty acid acylated, fatty alcohol esters of aminomalonic acid, aminosuccinic acid, aminoglutaric acid, aminoadipic acid, aminopimelic acid, aminosuberic acid, aminosebacic acid, aminoazelaic acid, and the like, including compounds of the formula

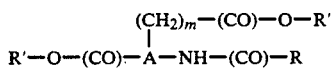

where m=0 to 9, and

A, R, and R' are as defined above, the R' groups being the same or different, such as fatty acid N-acylated aspartic acid and glutamic acid fatty alcohol diesters.

Fatty acids, or fatty acid derivatives, may be used to acylate amino acid amine nitrogen and, optionally, amino acid side chain groups. The term "fatty acids" used here means organic fatty acids of the formula RCOOH, where R is an aliphatic group containing 1 to 29 carbon atoms. Fatty acids may be synthetic or natural, saturated or unsaturated, with straight or branched chains. Examples of fatty acids that can be used in this invention are acetic, propionic, butyric, caproic, caprylic, pelargonic, capric, undecanoic, lauric, myristic, palmitic, stearic, arachidic, behenc, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acids.

Mixtures of fatty acids may also be used, for example, those derived from non-hydrogenated or (partially or fully) hydrogenated oils such as soybean, safflower, sunflower, high oleic sunflower, sesame, peanut, corn, olive, rice bran, canola, babassu nut, coconut, palm, palm kernel, lupin, nasturtium seed, mustard seed, cottonseed, low erucic rapeseed, high erucic rapeseed, meadowfoam, or marine oils, fats such as dairy butter, lard or tallow, or plant waxes such as jojoba. Specific fractions of unprocessed or processed oils, fats or waxes may also be used.

The amino acids of this invention are N-acylated with fatty acids or fatty acid derivatives to yield the R groups in the general formula set out above. The R groups may be the same or different, and may comprise a mixture of substituents. The R groups may be aliphatic groups, ether groups of the formula R"—O—R'''—, or ester groups of the formula R'''—O—(CO)— R"— or R"—(CO)—O—R'''—, where R"— and R'''— are, independently, aliphatic groups, provided that the sum of the number of carbon atoms in R" and R'" be 2 to 29. R, R", and R'" may be saturated or unsaturated, with linear or branched chains. By an "aliphatic" group is meant a monovalent radical derived from an aliphatic hydrocarbon by the removal of a hydrogen.

When the amino acids of this invention are acylated with simple fatty acids, the resulting R groups are aliphatic groups. When the amino acids of this invention are acylated, instead, with fatty acid derivatives, the R groups may be ether or ester groups. By an "ether group" is meant an oxaalkly group of the formula R"—O—R'''—, where R" and R'" are aliphatic groups as defined above. The ether group may be anywhere in the R chain, and the chain may be linear or branched, saturated or unsaturated. Ether R derivatives may be derived by using etheric carboxylic acids as acylating agents.

R may also be an ester group having 2 to 29 carbon atoms of the formula R"—(CO)—O—R'''—, where the R" and R'" are, independently, aliphatic groups as defined above. Compounds of this type include those wherein R is, structurally, an hydroxycarboxylate-extended fatty group such as that formed from the reaction of a fatty acid of the formula R"COOH with the hydroxyl group of an hydroxycarboxylic acid of the formula OH—R'''—COOH, for example, one in the lactic acid series, to yield the ester group R"—(CO)—O—R'''—. Thus, glycolic (hydroxyacetic, CH$_2$OH—COOH), hydracrylic (3-hydroxypropanoic acid, CH$_2$OH—CH$_2$—COOH), hydroxybutanoic acid (4-hydroxybutanoic, CH$_2$OH—(CH$_2$)$_2$—COOH, or the 2- or 3- isomer), hydroxypentanoic acid (5-hydroxypentanoic, CH$_2$OH—(CH$_2$)$_3$—COOH, or other isomer), and so forth may be used to N-acylate the amino group of an amino acid, and then the free hydroxyl group reacted with a fatty acid to form ester side chain R. Glycolic-extended R would have the formula R"—(CO)—O—CH$_2$—, hydracrylicextended R would have the formula R"—(CO)—)—(CH$_2$)$_2$—, and so forth. Ester side chains of this type can also be formed by acylating the amino group of an amino acid with a hydroxy fatty acid such as ricinoleic acid (CH$_3$(CH$_2$)$_5$—CHOH—CH$_2$—CH=CH(CH$_2$)$_7$COOH) and then esterifying the C$_{12}$ hydroxyl with an acid. The condensations described herein are made sequentially and in combination with techniques for protecting functional groups.

R may, alternatively, be an ester group of the formula R'''—O—(CO)—R"—, with the ester bond reversed as compared to derivatives acylated with hydroxycarboxylic acids. In this case, R may be derived by acylating the amino group with a dicarboxylic acid of the formula HOOC—R"—COOH, and then esterifying the second carboxylic group on the dicarboxylic acid with a fatty alcohol of the formula R'''OH (to be defined more explicitly infra). Dicarboxylic acids which may be used to form this type of ester R group include malonic acid, (COOH—CH$_2$—COOH), succinic acid (COOH—(CH$_2$)$_2$—COOH) and the like. Esterified with fatty alcohols, a malonyl-extended R group would have the formula R'''—O—(CO)—CH$_2$—, a succinyl-extended group would have the formula R'''—O—(CO)—CH$_2$—CH$_2$—, and so forth.

The N-acylated amino acids of this invention are esterified with fatty alcohols, or fatty alcohol derivatives. The term "fatty alcohols" used here means alcohols of the formula ROH, where R is an aliphatic group having as many as 30 carbon atoms. Examples of fatty alcohols include the fatty alcohol counterparts of the fatty acids enumerated above, namely, ethyl, propanyl, butyryl, caproyl, caprylyl, pelargonyl, capryl, lauryl, undecanyl, myristyl, palmityl, stearyl, arachidyl, behenyl, lignoceryl, cerotyl, montanyl, melissyl, palmitoleyl, oleyl, vaccenyl, linoleyl, linolenyl, eleostearyl, arachidyl, nervonyl, eicosapaentanyl, docosatetraenoyl, docosapentaenyl, and docosahexaenoyl alcohols. Mixtures of fatty alcohols may also be used, such as those obtained from the processed or unprocessed natural oils enumerated above, or specific fractions of the oils.

Simple fatty alcohols esterified to the carboxylate functionalities of amino acids yield alkyl R' groups. R' may also be an ether group having 2 to 30 carbon atoms, that is, an aliphatic chain having an ether group (—O—) anywhere in the chain as described for the R side chain above. R' may also be an ester group of the formula R''—O—(CO)—R'''— derived esterifying the carboxylate functionality with the hydroxyl group of an hydroxycarboxylic acid and then esterifying the hydroxycarboxylic acid carboxylic group with an alcohol (R'''OH) as described for the analogous ester R group above. Ester R' may, alternatively, be of the formula R'''—(CO)—O—R''—, with the ester bond reversed, representing a derivative formed by esterifying the carboxylate functionality with one hydroxyl group of a diol (HO—R''—OH) and then esterifying the second hydroxyl group of the diol with an acid (R'''COOH) to form a derivative similar to ester R group described above.

The R and R' groups will be selected to provide a discernible fatty character in the compounds. Thus, typically, most of the R groups have 3 or more carbon atoms, with ≧75% containing 3 to 23 (derived from acids having 4 to 24 carbons), more narrowly 9 to 19, and even more narrowly, 15 to 17 carbon atoms. In most cases, most of the R' groups have 4 or more carbon atoms, with ≧75% containing 4 to 24, more narrowly 10 to 20, and even more narrowly 16 to 18 carbon atoms. Preferred fat mimetics can have an array of R groups selected to include 95% having 13 to 17 carbon atoms and an array of R' selected to include 95% having 14 to 18 carbon atoms. In one embodiment, the R groups should be predominantly saturated $C_{13}$ to $C_{17}$ groups and the R' groups predominantly saturated $C_{14}$ to $C_{18}$ groups. In another embodiment, the R groups should be predominantly unsaturated $C_{15}$ to $C_{17}$ groups and the R' be predominantly unsaturated $C_{16}$ to $C_{18}$ groups (with a preponderance of monounsaturated groups).

The choice, number and arrangement of R and R' groups on amino acid derivative A will affect the biological as well as physical properties of the derivatized amino acid fat mimetic. Where, by virtue of any of these factors, fatty groups R and R' are metabolized, the caloric value of the compound will increase. The most preferred compounds are partially digestible. The preferred compounds of this invention would deliver 0.5 to 8.5 kcal per gram, preferably 0.5 to 6.0 kcal/gram, more narrowly 1 to 5 kcal/gram, even more narrowly 0.5 to 3.0 kcal/gram upon being metabolized.

Thus, in a preferred class of compounds, the fatty groups R and R' exhibit differential reactivity on digestion. This results not only in the controlled and limited availability of effective caloric value, but also the selective conversion of the fat mimetic to a product or intermediate with a less oil-like nature. The more readily digestible fatty group can be a highly desirable essential acid or a nutritionally advantageous carboxylic acid such as predominating in one or more of oleic, linoleic, linolenic, or eicosapentaenoic acids, as well as low molecular weight carboxylic acids (e.g., acetic, propionic, or butyric acids) which would limit caloric delivery and provide additional ability to control functionality.

As with natural triglycerides, the more readily digestible residue can, alternatively, be a fatty acid having beneficial attributes, such as, for example, those associated with conjugated linoleic acid isomers. The product of such a controlled digestive process may be said to have decreased hydrophobicity, and correspondingly increased hydrophilicity, relative to its fat mimetic precursor. Such a product of a process of controlled digestion would tend to have not only decreased oiliness, but also increased ability to function as an emulsifier. Such a controlled digestion product will be less prone to exist in the GI tract as a persistent oil compared with substances taught in the prior art. Ideally, the enhanced emulsifying capacity of the enzymatic cleavage product derived from compositions of the invention would actually be an aid to digestion, substantially overcoming a major problem which has heretofor limited the widespread use and development of highly desirable low calorie synthetic fats and oils in foods and food preparation.

N-acylated amino acid ester compounds having a side chain may be derived from amino acids having three reactive groups (one amino, one carboxylate, and a third amino, carboxylate, hydroxyl, or thiol on the side chain). As compared to natural triglycerides with three esterified hydroxyl groups, the preferred compounds thus have one reversed ester, one amide, and a third regular ester, amide, reversed ester or covalently linked fatty group. While not wishing to be bound to any theory, it is believed that this arrangement and nature of linkages attaching the fatty groups impart distinctive properties to this new class of fat mimetics.

Preferred structures include, but are not limited to:

A) N-acyl amino acid diesters, i.e., acylated amino acids having an acylated amino group and two esterified carboxylic groups of the general structure:

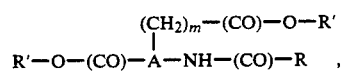

where
A is a hydrocarbyl group having 1 to 6 carbons,
m = 0 to 9,
and R and R' are as defined above,
the various R and R' being the same or different.
Compounds of this type include derivatives of aspartic acid, having the general formula,

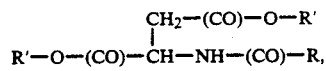

derivatives of glutamic acid having the general formula,

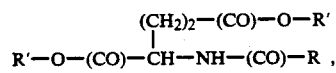

derivatives of gamma-methylene glutamic acid having the general formula,

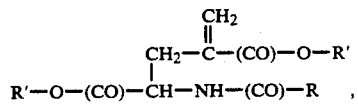

derivatives of aminopimelic having the general formula,

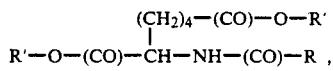

and the like, where R and R' are as defined above.

B) Di-N-acyl amino acid esters, i.e., diamide compounds derived from amino acids having two acylated amino groups and one esterified carboxylic of the general formula,

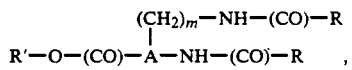

where
A is a hydrocarbyl group having 1 to 6 carbons,
m=0 to 9,
and R and R' are as defined above,
the various R and R' being the same or different.
Compounds of this type include derivatives of lysine having the general formula,

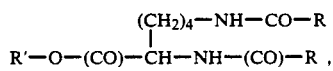

derivatives of ornithine having the general formula,

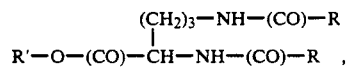

derivatives of alpha, gamma-diaminobutyric acid having the general formula,

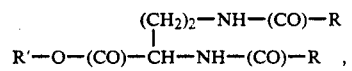

and the like, where R and R' are as defined above.

(C) N-acyl amino acid diester derivatives having an acylated amino group, an esterified carboxylic group, and an acylated hydroxyl or thiol amino acid side chain. These may be depicted by the general formula,

where
A is a hydrocarbyl group having 1 to 6 carbons,
X is an amino acid side chain consisting of, or terminating in,
a O—(CO)—R" or —S—(CO)—R" group, where R" has 1 to 24 carbons,
and R and R' are as defined above,
the various R, R', and R" being the same or different.
Compounds of this type include derivatives of serine having the general formula,

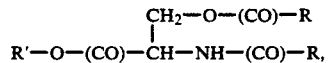

derivatives of threonine having the general formula,

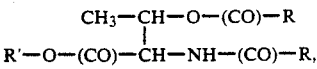

derivatives of tyrosine having the general formula,

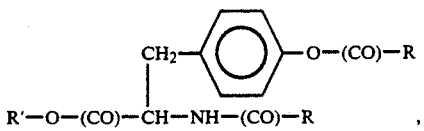

derivatives of cysteine having the general formula,

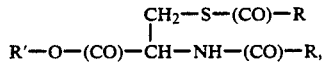

derivatives of beta-thiovaline having the general formula,

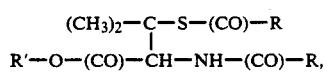

and the like, where R and R' are as defined above.

D) N-acyl amino acid esters having an alkyl group, derived by the amino group and esterifying the carboxylic group of an amino acid having an alkyl side chain. These derivatives have three fatty side chains: one attached in amide linkage, one in ester linkage, and a third covalently linked to the hydrocarbyl amino acid backbone. These may be depicted by the general formula,

where
A is a hydrocarbyl group having 1 to 6 carbons,
Y is an aliphatic group having 1 to 25 carbons,
and R and R' are as defined above,
the various R and R' groups being the same or different.

Examples of this type of acylated amino acid ester includes:

derivatives of valine having the general formula,

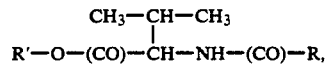

derivatives of leucine having the general formula,

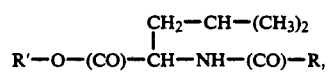

derivatives of isoleucine having the general formula,

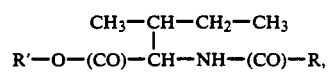

derivatives of alpha-aminopalmitic acid,

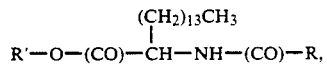

and the like, where R and R' are as defined above.

E) N-acyl amino acid derivatives, compounds having an acylated amino group, an esterified carboxylic group, and a third group derived from the free or acylated side chain of an amino acid. These have the general formula,

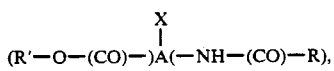

where
- A is a hydrocarbyl group having 1 to 6 carbons,
- X is a free or acylated amino acid side chain having 1 to 25 carbons, and
- R and R' are as defined above,
- the various R and R' groups being the same or different.

Examples of this type of acylated amino acid esters include derivatives of arginine having the general formula,

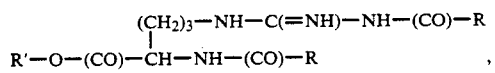

derivatives of glutamine having the general formula,

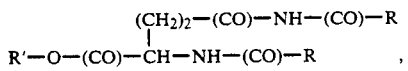

derivatives of asparagine having the general formula,

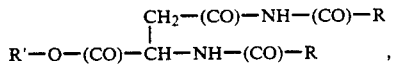

derivatives of phenylalanine having the general formula,

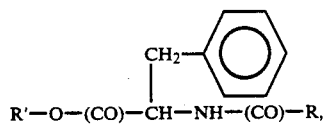

derivatives of trypotophan having the general formula,

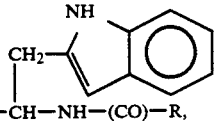

derivatives of proline having the general formula,

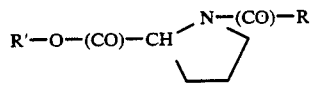

derivatives of cystine having the general formula,

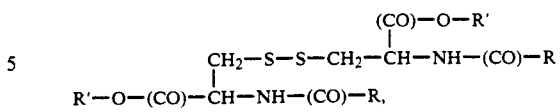

and the like, where R and R' are as defined above.

The structures illustrate that X can be an aliphatic or aromatic side chain of an amino acid or an acylated side chain, that is, a side chain having an ester group of the formula —O—(CO)—R" or a thioester group of the formula —S—(CO)—R", where R" is as defined above. X may, additionally, have a thioether of the formula —S—R" or —R"—S—R", where R" is as defined above, or, as in the case of cystine, a disulfide, with the amino group acylated and the carboxyl group esterified as illustrated above. When A is derived, for example, from leucine or isoleucine or other amino acid having an alkyl side chain, X is aliphatic chain having 1 to 25 carbon atoms. When A is derived from a sulfur-containing amino acid, X is a thioether or thioester group; thus, when A is derived from methionine, X is a thioether of the formula $CH_3-S-CH_2-CH_2-$. When A is derived from tyrosine or phenylalanine, X is an aromatic. When A is derived from an amino acid having an hydroxyl group in its side chain, serine, for example, X is an ester having the formula R"—(CO)—O—CH$_2$—. Where X has a nitrogen, as in the case of trypotophan or proline, the nitrogen may be acylated to form another fatty side chain.

The acylated amino acid esters of this invention may be incorporated either alone, or in combination with another fat and/or fat mimetic, into any food composition or used in conjunction with any edible material. Other fats include natural triglycerides rich in highly desirable or essential fatty acids, such as oleic, linoleic, linolenic, or eicosapentaenoic acid, triglycerides bearing fatty acids having beneficial attributes such as those associated with conjugated linoleic acid isomers, medium chain triglycerides and the like. Other fat mimetics include any heretofore suggested as edible fat replacements, including, but not limited to, sugar ester (such as the sucrose polyester fat replacements disclosed, for example, in Eur. Pat. Ap. Pub. No. 236,288 to Bernhardt and U.S. Pat. No. 4,797,300 to Jandacek and Letton, the disclosures of which are incorporated herein by reference), neoalkyl esters, polyglycerol esters, malonate esters, propoxylated glycerols, retrofats, carboxy/carboxylates, polyvinyl alcohol esters and the like. Also of use in combination with the fat mimetics of this invention are the proteinaceous fat replacements disclosed in U.S. Pat. No. 4,734,287 to Yamamoto and Latella and U.S. Pat. No. 4,855,156 to Singer, et al., the disclosures of which are hereby incorporated by reference.

In the practice of this invention, food products comprising fat ingredients and nonfat ingredients have all or a portion of the fat ingredient replaced by the acylated amino acid esters of this invention. When employed either alone or in food products with other fats or fat mimetics, the amino acid derivatives of this invention are desirably added in amounts effective to provide a significant caloric reduction of the calories due to fat. For example, a 5 to 10% or greater replacement would be effective for this purpose, and replacements of at least 20% are desired in many cases. A fat replacement of more than 20%, e.g., at least 25%, more particularly 50 to 100%, are desired in other embodiments. Replacements of one third are typical, and in many cases replacements of 75% or more are desired.

It is an advantage of this invention that the physical properties of the fat mimetics can be varied over wide ranges by judicious selection of amino acid and the fatty acyl and ester substituents (R and R'). Formulations for chocolate or confectionery applications, for example, can employ groups or components yielding high-flow-temperature, sharply melting mixtures; salad oils can employ groups or components yielding low to medium-flow temperature mixtures that do not readily crystallize upon refrigeration; margarines and shortenings can employ groups or components yielding plastic mixtures; bakery products may employ groups or components stable to oxidation on storage, and so forth. By "flow temperature" is meant the temperature at which a one centimeter cube of the material, upon heating and supporting one 0.1 gram weight begins to flow. For purposes of definition, low temperatures will be within the range of up to 40° F., medium flow temperatures are within the range of from 40° to 70° F. and high flow temperatures are above 70°, but preferably below 98° F.

The term "edible material" is broad and includes anything edible, whether or not intended for nutrition, e.g., it can be an additive such as an antioxidant for fats or oils, an antispatter agent, an emulsifier, a texture modifier such as a plasticizer for chewing gum, a component for cosmetics, or other minor functional ingredient such as a carrier or diluent for use in flavorings, pharmaceuticals, and the like.

Broadly speaking, the acylated amino acid esters of this invention can be employed as fat replacements in fat-containing edible emulsions comprising an oil phase and an aqueous phase, including those high in fat (e.g., 75 to 85%), such as margarines and salad dressings, and those high in water (e.g., 25 to 75%), such as low fat spreads. The fat mimetics of this invention can be employed as full or partial fat substitutes in dairy, meat, nut, egg, and other food products having a high natural fat component, and in vegetable, cereal and other products having a low natural fat component. The fat mimetics of this invention can be employed as ingredients for all types of leavened baked products, both yeast raised and chemically leavened, and unleavened baked products, and as coatings or coating ingredients for the same types of products. The fat mimetics of this invention can be employed as an ingredient or a coating for snack food prodicts, as well as a frying oil or a frying oil ingredient for fried snacks. In addition, the low calorie fat mimetics of the present invention can be employed to form edible barrier layers, either on the exposed surfaces of foods or as internal barrier layers used to separate various portions of a food product, e.g., as a barrier between a dessert filling and an outer edible shell.

Representative of fat-containing food products which can contain, in addition to other food ingredients, the acylated amino acid esters of this invention in full or partial replacement of natural or synthetic fat are: frozen desserts, e.g., frozen novelties, ice cream, sherbet, ices, and milk shakes; salad dressings; mayonnaises and mustards; dairy and non-dairy cheese spreads; margarine, margarine substitutes and blends; flavored dips; flavored bread or biscuit spreads; filled dairy products such as filled cream and filled milk; frying fats and oils; cocoa butter replacements and blends; candy, especially fatty candies such as those containing peanut butter or chocolate; reformed and comminuted meats; meat substitutes and extenders; egg products and substitutes; nut products such as peanut butter; vegetable and fruit products; pet foods; whipped toppings; compound coatings; coffee lighteners, liquid and dried; puddings and pie fillings; frostings and fillings; chewing gum; breakfast cereals; bakery products, e.g., cakes, breads, rolls, pastries, cookies, biscuits, and savory crackers; and mixes or ingredient premixes for any of these. The low calorie fat mimetics of this invention may also be employed in any flavor, nutrient, drug or functional additive delivery system.

Exemplary food products which can be improved by the use of the acylated amino acid esters of this invention are: baked foods, such as cookies, crackers, biscuits, cakes and the like which all contain at least a flour or starch component in addition to the low calorie fat mimetics of this invention; snack products which are fried or coated with fat or oil and/or also contain at least a flour or starch component in addition to the low calorie fat mimetics; emulsion products, such as margarine products (e.g., full-fat, low-fat, and fat substitute products), salad dressing and mayonnaise which all contain emulsions having a fat phase including the low calorie fat mimetics and an aqueous phase; candies and confections which contain a sweetener such as sugar or aspartame in addition to the low-calorie fat mimetics; and dairy product substitutes which contain a dairy protein such as whey, casein or caseinate, or the like in addition to the low calorie fat mimetics. The margarine products also typically contain a milk component and butter flavor, while the salad dressings will contain spices and the mayonnaise, egg. Among the baked products, cakes and cookies also contain sweeteners and the crackers typically contain salt.

In one of its broad aspects, the invention provides a process for preparing a food product with reduced calories comprising adding a fat mimetic of the invention to at least one other food ingredient in the preparation of the food. The fat mimetic can be in total or partial substitution of the normal or natural fat content. Typical food ingredients will be selected from the group consisting of protein, carbohydrates, fats, nutrients, and flavors. These ingredients are typically added in the form of flours, meals, fruits, dried fruits, vegetables, dried vegetables, meats, dried meats, starches, spices, salt, dried milk solids, sugars, acidulents, buffers, emulsifiers, stabilizers, gums, hydrophilic colloids, salts, antioxidants, colors, preservatives and the like. The fat mimetic will typically be employed in an amount of at least 5%, e.g., from 10 to 90% of the composition, and one or more other food ingredients will be present at 10 to 90%. More specific ranges, appropriate for various products, are given in the Examples.

It is a further advantage of the invention that desirable physical properties can be achieved in foods containing high concentrations of naturally-occurring cis monounsaturates by blending the fat mimetics with oils rich in these, such as corn, soybean, canola, peanut, and cottonseed oils, and tallow, lard, and mixtures and fractions of these. Alternatively, it is possible to employ fatty acids or mixtures of fatty acids from fractions of one or more of these oils.

In one embodiment, the low calorie fat mimetics of this invention are mixed with natural oils such that the ratio of unsaturated to saturated residues in the resulting blend lies between 1 and 10, more narrowly between 2 and 6, and even more narrowly between 3 and 5. In one embodiment, the polyunsaturated to saturated ratio is above 10; in another, between 10 and 25. Additionally, this ratio can be increased even more by blending the fat mimetic with a highly polyunsaturated oil such as safflower, sunflower, sorghum, soybean, peanut, corn, cottonseed and sesame oils.

The following is a list of representative, but not limiting, examples of specific acylated amino acid esters of this invention:

Palmityl N-Oleoyl-Beta-Alaninate (1)

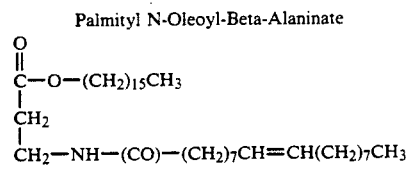

Dioleyl N-Oleoyl-Aspartate (2)

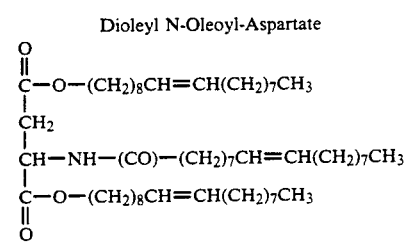

Di(myristoyloxyethyl) N-Myristoyl-Aspartate (3)

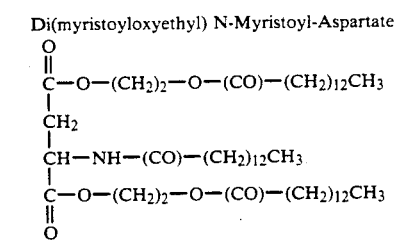

Distearyl N-Stearoyl-Aspartate (4)

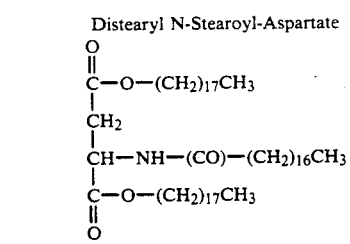

Di(stearoyloxypropyl) N-Stearoyl-Glutamate (5)

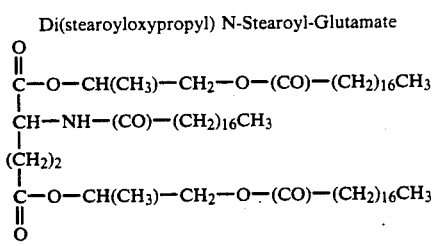

Dioleyl N-Myristoly-Aspartate (6)

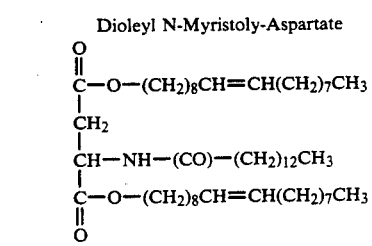

Lauryl Beta-Lauroyloxyethyl N-Palmitoyl-Aspartate (7)

-continued

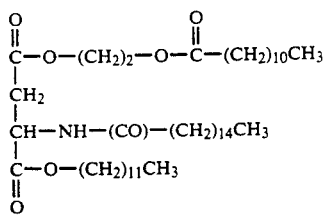

Oleyl N-Caproyl-O-Myristoyl-Serinate (8)

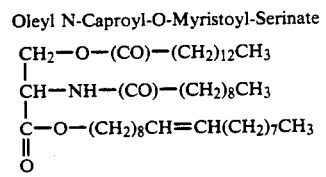

Palmityl N-Myristoyl-O-Behenoyloxyacetyl-Serinate (9)

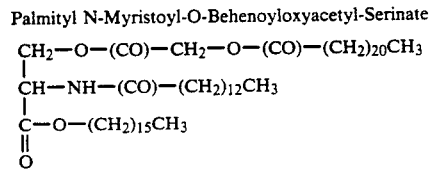

Oleyl N-Oleoyl-Leucinate (10)

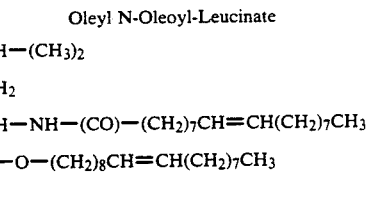

5-Oxanonanyl N-Lauryloxymalonyl-Leucinate (11)

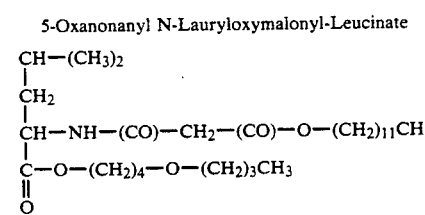

Oleyl N-Oleoyl-Gamma-Aminobutyrate (12)

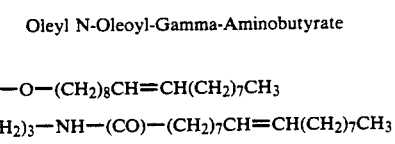

Dimyristyl N-Acetoxyricinoyl-Gamma-Glutamate (13)

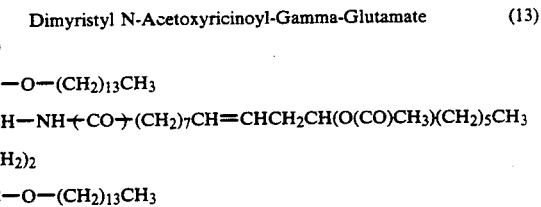

Arachidyl N-10-Undecenoyl-Valinate (14)

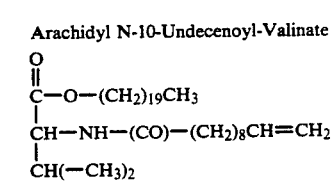

Palmityl Alpha-N-Stearoyl-Delta-N-Myristoyl-Glutaminate (15)

-continued $$\begin{array}{l}\overset{O}{\overset{\|}{C}}-O-(CH_2)_{15}CH_3\\ \overset{|}{CH}-NH-(CO)-(CH_2)_{16}CH_3\\ (CH_2)_2-(CO)-NH-(CO)-(CH_2)_{12}CH_3\end{array}$$

Pelargonyloxyethyl N-Stearoyl-O-Caproyl-Serinate (16)

$$\begin{array}{l}CH_2-O-(CO)-(CH_2)_8CH_3\\ \overset{|}{CH}-NH-(CO)-(CH_2)_{16}CH_3\\ \overset{|}{\underset{\|}{C}}-O-(CH_2)_2-O-(CH_2)_8CH_3\\ \overset{\|}{O}\end{array}$$

Myristyl N-Lauroyl-O-Myristoyl-Threoninate (17)

$$\begin{array}{l}CH_3\\ \overset{|}{CH}-O-(CO)-(CH_2)_{12}CH_3\\ \overset{|}{CH}-NH-(CO)-(CH_2)_{10}CH_3\\ \overset{|}{\underset{\|}{C}}-O-(CH_2)_{13}CH_3\\ \overset{\|}{O}\end{array}$$

Oleyl N,N'-Dioleoyl-Lysinate (18)

$$\begin{array}{l}\overset{O}{\overset{\|}{C}}-O-(CH_2)_8CH=CH(CH_2)_7CH_3\\ \overset{|}{CH}-NH-(CO)-(CH_2)_7CH=CH(CH_2)_7CH_3\\ (CH_2)_4-NH-(CO)-(CH_2)_7CH=CH(CH_2)_7CH_3\end{array}$$

Stearyl N-Oleoyl-Phenylalaninate (19)

$$\begin{array}{l}\overset{O}{\overset{\|}{C}}-O-(CH_2)_{17}CH_3\\ \overset{|}{CH}-NH-(CO)-(CH_2)_7CH=CH(CH_2)_7CH_3\\ \overset{|}{CH_2}-\text{C}_6H_5\end{array}$$

Oleyl Gamma-N-Oleoyl-Alpha, (20)
Delta-Distearoyloxy-Aminopentanoate $$\begin{array}{l}CH_2-O-(CO)-(CH_2)_{16}CH_3\\ \overset{|}{CH}-NH-(CO)-(CH_2)_7CH=CH(CH_2)_7CH_3\\ \overset{|}{CH_2}\\ \overset{|}{CH}-O-(CO)-(CH_2)_{16}CH_3\\ \overset{|}{\underset{\|}{C}}-O-(CH_2)_8CH=CH(CH_2)_7CH_3\\ \overset{\|}{O}\end{array}$$

Dioleyl N-Myristoyl-Beta-Glutamate (21)

$$\begin{array}{l}\overset{O}{\overset{\|}{C}}-O-(CH_2)_8CH=CH(CH_2)_7CH_3\\ \overset{|}{CH_2}\\ \overset{|}{CH}-NH-(CO)-(CH_2)_{12}CH_3\\ \overset{|}{CH_2}\\ \overset{|}{\underset{\|}{C}}-O-(CH_2)_8CH=CH(CH_2)_7CH_3\\ \overset{\|}{O}\end{array}$$

Myristyl Soybean Acylated Threonine Ester Derivative (22)

$$\begin{array}{l}CH_3\\ \overset{|}{CH}-O-(CO)-R\\ \overset{|}{CH}-NH-(CO)-R\\ \overset{|}{\underset{\|}{C}}-O-(CH_2)_{13}CH_3\\ \overset{\|}{O}\end{array}$$

where the R groups are derived from soybean oil

-continued

Oleyl Gamma-N-Oleoyl-Beta, (23)
Epsilon-Dioleoyloxy-Aminohexanoate $$\begin{array}{l}CH_2-O-(CO)-(CH_2)_7CH=CH(CH_2)_7CH_3\\ \overset{|}{CH_2}\\ \overset{|}{CH}-NH-(CO)-(CH_2)_7CH=CH(CH_2)_7CH_3\\ \overset{|}{CH_2}-O-(CO)-(CH_2)_7CH=CH(CH_2)_7CH_3\\ \overset{|}{CH_2}\\ \overset{|}{\underset{\|}{C}}-O-(CH_2)_8CH=CH(CH_2)_7CH_3\\ \overset{\|}{O}\end{array}$$

Myristoyloxyethyl N-Palmitoyl-Beta-Alaninate (24)

$$\begin{array}{l}\overset{O}{\overset{\|}{C}}-O-CH_2-CH_2-O-\overset{O}{\overset{\|}{C}}-(CH_2)_{12}CH_3\\ \overset{|}{(CH_2)_2}-NH-(CO)-(CH_2)_{14}CH_3\end{array}$$

Capryloxypropyl N-Linoleoyl-Beta-Alaninate (25)

$$\begin{array}{l}\overset{O}{\overset{\|}{C}}-O-(CH_2)_3-O-(CH_2)_9CH_3\\ \overset{|}{CH_2}\\ \overset{|}{CH_2}-NH-(CO)-(CH_2)_7CH=CHCH_2CH=CH(CH_2)_4CH_3\end{array}$$

Safflower Oil Acylated and Alcohol Esterified (26)
Glutamic Acid Ester Derivative $$\begin{array}{l}\overset{O}{\overset{\|}{C}}-O-R'\\ \overset{|}{(CH_2)_2}\\ \overset{|}{CH}-NH-(CO)-R\\ \overset{|}{\underset{\|}{C}}-O-R\\ \overset{\|}{O}\end{array}$$

where R and R' are derived from safflower oil

Corn Oil Acylated and Alcohol Esterified (27)
Aspartic Acid Ester Derivative $$\begin{array}{l}\overset{O}{\overset{\|}{C}}-O-R'\\ \overset{|}{CH_2}\\ \overset{|}{CH}-NH-(CO)-R\\ \overset{|}{\underset{\|}{C}}-O-R\\ \overset{\|}{O}\end{array}$$

where R and R' are derived from corn oil

Lauryl N-Stearoyl-2-Aminostearate (28)

$$\begin{array}{l}\overset{O}{\overset{\|}{C}}-O-(CH_2)_{11}CH_3\\ \overset{|}{CH}-NH-(CO)-(CH_2)_{16}CH_3\\ (CH_2)_{15}CH_3\end{array}$$

Dipalmityl, N,N'-Distearoyl-Cystinate (29)

$$\begin{array}{l}\overset{O}{\overset{\|}{C}}-O-(CH_2)_{15}CH_3\\ \overset{|}{CH}-NH-(CO)-(CH_2)_{16}CH_3\\ \overset{|}{CH_2}-S-S-CH_2-\overset{|}{CH}-(CO)-O-(CH_2)_{15}CH_3\\ \quad\quad\quad\quad\quad\quad\quad\overset{|}{NH}-(CO)-(CH_2)_{16}CH_3\end{array}$$

Palmityl N,S-Distearoyl-Cysteinate (30)

-continued

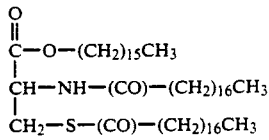

EXAMPLES

The following examples are presented to further illustrate and explain the present invention and should not be taken as limiting in any regard. Unless otherwise indicated, all parts and percentages are by weight, and are based on the weight at the particular stage of the processing being described. The proton NMR spectra have assigned chemical shifts, multiplicities, and intensities consistent with the structures for which they are reported.

EXAMPLE 1

Dioleyl N-oleoyl-L-aspartate, an acylated amino acid ester derivative of this invention, is synthesized in this example.

Preparation of Intermediate:

Dioleoyl N-t-butoxycarbonylaspartate is first prepared as an intermediate. N-t-butoxycarbonyl-L-aspartic acid (2.30 g, 0.01 mole) is dissolved in 60 mL dimethylformamide, dichloromethane (1/5, v/v). With stirring, 4.35 g (0.02 mole) N,N-dicyclohexyl-carbodiimide and 0.2 g (0.016 mole) 4-dimethylaminopyridine are added, and to this slurry is added 5.3 g (0.02 mole) technical grade oleyl alcohol. After stirring overnight, by-product dicyclohexylurea is recovered by suction filtration and the filtrate is concentrated in vacuo. The residue obtained is purified by flash chromatography on silica to give 3.5 g of the title compound as a clear oil.

Proton NMR spectrum in chloroform-d: chemical shift in ppm (multiplicity, intensity, assignment): 5.49 (doublet, 1 H, NH), 5.35 (multiplet, 4 H, HC=CH), 4.53 (multiplet, 1 H, methine proton), 4.14 and 4.08 (overlapping triplets, 4 H, O—$CH_2$), 2.99 and 2.81 (doublets of doublets, 2 H, O=C—$CH_2$—C— C=O), 2.02, 1.62 and 1.30 (multiplets, 56 H, —$CH_2$—), 1.47 (singlet, 9 H, t-butyl) and 0.89 (triplet, 6 H, —$CH_3$).

Preparation of Final Product:

The colorless oil dioleyl N-t-butoxycarbonylaspartate, 3.5 g, is stirred with 50 mL of 50% trifluoroacetic acid/ dichloromethane at room temperature for 20 minutes at which time the solution is cooled in an ice bath and diluted cautiously with 30 mL water. Sufficient triethylamine is added to neutralize the trifluoroacetic acid, and the dioleyl aspartate is obtained by extraction into dichloromethane (5×50 mL). The organic phase is washed with water (3×40 mL), dried over $MgSO_4$ filtered, and concentrated to yield 1.7 g of a viscous yellow oil, dioleyl aspartate.

The yellow oil from above is treated with a 10% excess of oleoyl chloride and is stirred for 30 minutes at room temperature. The dioleyl N-oleoyl-L-aspartate (0.7 g), a white solid, is obtained in pure form through silica gel chromatography 9/1 v/v; hexane/ethyl acetate) of the reaction mixture.

Proton NMR spectrum in chloroform-d: chemical shift in ppm (multiplicity, intensity, assignment): 6.42 ppm (doublet, 1 H, NH), 5.35 (multiplet, 6 H, CH=CH), 4.85 (multiplet, 1 H, CHN), 4.15 (triplet, 2 H, $CH_2O$), 4.08 (triplet, 2 H, $CH_2O$), 2.8-3.06 (2 doublets of doublets, 2 H, $CH_2CO_2$), 2.22 (triplet, 2 H, $CH_2CO$), 2.02 (multiplet, 12 H, $CH_2C$=C), 1.65 (multiplet, 2 H, $CH_2CCO$), 1.32 (multiplet, 60 H, $CH_2$), 0.89 (multiplet, 9 H, $CH_3$).

EXAMPLE 2

Distearyl N-stearoyl-L-aspartate, another acylated amino acid ester derivative of this invention, is prepared in this example.

Preparation of Intermediate:

Distearyl-N-t-butoxycarboxylaspartate is first prepared as an intermediate. To a magnetically stirred solution of 4.60 g (0.02 mole) N-t-butoxy-carbonyl-L-aspartic acid in 60 mL of 20% dimethylformamide/dichloromethane is added 8.70 g (2 equivalents) N,N'-dicyclohexylcarbodiimide and 0.2 g 4-dimethylaminopyridine. To the suspension is then added 10.6 g (0.04 mole) stearyl alcohol, and the mixture is stirred overnight. The dicyclohexyl urea is filtered off, the solvent removed in vacuo, and the oily residue is purified by flash silica chromatography to yield 6.8 g of distearyl N-t-butoxycarbonylaspartate.

Proton NMR in chloroform-d: chemical shift in ppm (multiplicity, intensity, assignment): 5.47 (doublet, 1 H, NH), 4.57 (multiplet, 1 H, CHN), 4.14 and 4.08 (2 triplets, 4 H, $CH_2O$), 2.8 and 3.0 (2 doublets of doublets, 2 H, $CH_2CO_2$), 1.42 (multiplet, 4 H, $CH_2C$—O), 1.45 (singlet, 9 H, t-butyl), 1.35 (multiplet, 56 H, $CH_2$), 0.89 (multiplet, 6 H, $CH_3$).

Preparation of Final Product:

Distearyl N-t-butoxycarbonylaspartate, 6.6 g, is stirred with 50 mL of 50% trifluoroacetic acid/dichloromethane at room temperature for 20 minutes at which time the solution is cooled in an ice bath and diluted cautiously with 50 mL water. Sufficient triethylamine is added to neutralize the trifluoroacetic acid, and the distearyl aspartate is obtained by extraction into dichloromethane (5×70 mL). The organic phase is washed with water (3×40 mL), dried over $MgSO_4$, filtered, and concentrated to yield 3.4 g of a viscous oil, distearyl aspartate.

The oil from above is treated with a 10% excess of stearoyl chloride and stirred for 30 minutes at room temperature. The distearyl N-stearoyl-L-aspartate (1.4 g), a white solid, is obtained in pure form by silica gel chromatography (9/1; v/v; hexane/ethyl acetate) of the reaction mixture.

Proton NMR in chloroform-d: chemical shift in ppm (multiplicity, intensity, assignment): 6.43 ppm (doublet, 1 H, NH), 4.86 (multiplet, 1 H,CHN), 4.15 (triplet, 2 H, $CH_2O$), 4.08 (triplet, 2 H, $CH_2O$), 2.8-3.06 (2 doublets of doublets, 2 H, $CH_2CO_2$), 2.22 (triplet, 2 H, $CH_2CO$), 1.65 (multiplet, 2 H, $CH_2CCO$), 1.33 (multiplet, 84 H, $CH_2$), 0.89 (multiplet, H, $CH_3$).

EXAMPLE 3

Following the procedure outlined in Example 1, corn oil derived fatty alcohols and corn oil derived fatty acids are used to prepare a corn oil acylated and alcohol esterified aspartic acid ester derivative, another novel fat mimetic of this invention.

EXAMPLE 4

Following the procedure for preparation of a final product in Example 1, a 10% excess of myristoyl chloride is stirred for 30 minutes at room temperature with dioleyl aspartate. Dioleyl N-myristoyl-L-aspartate, another fat mimetic of this invention, is obtained and further purified by silica gel chromatography.

EXAMPLE 5

This example outlines the procedure for estimating the in vitro digestibility of the synthetic acylated amino acid esters of this invention using pancreatic lipase.

Preparation of Reagents and Materials:

1. Buffer: A pH 7.1 phosphate buffer is prepared by dissolving 6.8 g $KH_2PO_4$ in 1 L of millipore filtered water (to yield 0.05 M phosphate). Fifty mg $Ca(NO_3)_2$ and 5.0 g cholic acid (Na salt, an ox bile isolate from Sigma) are added to give 0.3 mM $Ca^{++}$ and 0.5% cholic acid in 0.05 M phosphate. The pH is adjusted to approximately 7.1 with solid NaOH. Several drops of Baker "Resi-analyzed" toluene are added to prevent bacterial growth during storage at 3°–5° C.

2. Lipase: About 15 mg/mL commercial porcine pancreatic lipase from U.S. Biochemical Corporation is dissolved in buffer.

3. Substrates and Standards: A 1.0 mL volumetric flask is charged with an amount of lipid substrate (test substance or standard) calculated to give a concentration of 200 nanomoles per microliter in Baker "Resianalyzed" toluene. (The proper concentration may be approximated by doubling the molecular weight of the lipid in question, dividing by 10, and diluting to the mark; this yields about 200 nanomoles per microliter.) This preparation affords the substrate to be used in the hydrolysis reactions.

Fatty acids and glyceride standards from Nu Chek or Sigma are prepared for elution on TLC plates (prewashed with 1:1 chloroform/methanol) by diluting the substrate solution with 10:1 toluene (1 part substrate plus 9 parts toluene) in septum vials.

Procedure:

In a 25 mL Erlenmeyer, emulsify 20 mL buffer and 40 microliters of substrate using an ultrasonic disrupter at a microtip maximum setting for approximately 10 seconds. This results in a 0.4 microliter/milliliter emulsion. Place in a 37° C. water bath and stir vigorously. After temperature equilibration, add 40 microliters of enzyme solution and start timing. Remove 5.0 mL aliquots at convenient time intervals for analysis. To establish a standard curve for triolein, aliquots are taken at 10, 20, 30 and 40 minutes. A zero time control should be run for all test compounds.

Add the aliquot to a 15 mL glass centrifuge tube containing a drop of concentrated HCl. Add approximately 3 mL of a 2:1 mixture of $CHCl_3:CH_3OH$ and shake vigorously. Centrifuge at approximately 5000 rpm for 5 minutes and transfer the bottom layer with a Pasteur pipet to a 5 mL septum vial. Repeat the extraction step once and combine the two bottom layers. Evaporate the solvent in nitrogen gas. After about half of the solvent is removed, add an equivalent volume absolute ethanol and continue evaporation in a nitrogen stream until dryness is achieved. Samples may be warmed with a heat gun to facilitate drying.

When the samples are dry, add exactly 200 microliters of toluene containing 10% DMSO, cap tightly, and spot TLC plate with 2.0 microliters per channel. (If 100% extraction efficiency of a zero time control is achieved, this amounts to 20 nanomoles of substrate spotted on the plate.) Develop with a suitable solvent system, for example, hexane: ethyl ether: chloroform: acetic acid in a volume ratio of 60:20:20:1. After 15 cm elution, dry plate with a heat gun and determine amounts of starting substrate and products of hydrolysis by scanning 10 to 20 nanomoles per channel at a wavelength of 190 nm using the CAMAG TLC Scanner II densitometer equipped with a Spectra Physics 4270 integrator and comparing with controls run at the same time.

Results:

Using this procedure with the dioleyl N-oleoyl-L-aspartate prepared in Example 1, no hydrolysis is observed after three hours contact with pancreatic lipase. Using a triglyceride control, triolein is substantially hydrolyzed in 10 minutes with this enzyme system.

EXAMPLE 6

Sweet Chocolate. A low calorie sweet chocolate may be prepared by combining:

| Ingredient | parts |
|---|---|
| Cocoa Powder | 1.0 |
| Sugar | 1.0 |
| To this is added a portion of | |
| Example 2 Amino Acid Derivative | 1.0 | and the ingredients are mixed thoroughly and passed through a refiner to reduce the particles to desired size. The material is conched, and the remaining amino acid derivative is added. The mixture is poured into molds and quenched cooled. No tempering regimen is necessary.

Chocolate Chips. The chocolate prepared above may be melted and deposited into nibs in the usual process.

EXAMPLE 7

Sugar Cookies. Sugar cookies may be prepared by blending:

| Ingredient | parts |
|---|---|
| Sugar | 231 |
| Example 3 Amino Acid Derivative | 114 |
| Salt | 3.7 |
| Sodium Bicarbonate | 4.4 |
| Water | 37.4 |
| 5.9% Dextrose Solution (wt/wt) | 58.7 |
| Flour | 391 |

All of the ingredients are creamed together. The dough so formed may be extruded and baked by the usual process.

EXAMPLE 8

Margarine. Margarine may be prepared by combining the ingredients for the following two phases:

| | parts |
|---|---|
| Oil Phase Ingredients | |
| Example 1 Amino Acid Derivative | 59.0 |
| Soybean Hardstock (IV 65) | 40.0 |
| Emulsifier | 1.0 |
| Aqueous Phase Ingredients | |
| Water | 95.8 |
| Milk Solids | 2.0 |
| Salt | 2.0 |
| Citric Acid | 0.1 |
| Beta Carotene | 0.1 |

The phases are emulsified in an oil:aqueous phase ratio of 80:20, and passed through a cool scraped surface heat exchanger in the usual process.

EXAMPLE 9

Flavor Bits. Flavor bits for incorporation into baked goods may be prepared by combining the following ingredients:

| Ingredient | parts |
| --- | --- |
| Sucrose | 215 |
| Water | 180 |
| Corn Syrup | 160 |
| Example 8 Margarine | 28 |
| Flavor | 12 |
| Citric Acid | 10 |
| Glycerine | 8 |
| Salt | 5 |
| Dye | 1 |

The first three ingredients are heated to 290° F. and the heat removed. Margarine is mixed in, and the mixture allowed to cool to 160°-170° F. before adding the remaining ingredients. (Almost any flavoring material may be used as flavor, for example, butterscotch or nut.) The mixture is then poured into a cold aluminum pan and frozen in dry ice. The frozen mixture is then cracked and milled into bits.

EXAMPLE 10

Butterscotch Cookies. Butterscotch cookies may be prepared by blending:

|  | parts |
| --- | --- |
| Flour | 22.0 |
| Example 4 Amino Acid Derivative | 20.0 |
| Salt | 0.7 |
| Sodium Bicarbonate | 0.1 |
| Monocalcium Phosphate | 0.1 |
| Vanillin | 0.1 |
| Water | 8.0 |
| and mixing well. To this is added | |
| Sugar | 30.0 |
| which is mixed until dispersed. Then | |
| Butterscotch Bits from Example 9 | 19.0 | are added and mixed until just blended prior to depositing and baking by the usual process.

EXAMPLE 11

Vanilla Wafers. To prepare vanilla wafers, blend:

| Ingredient | parts |
| --- | --- |
| Flour | 40 |
| Sugar (10X) | 28 |
| Example 1 Amino Acid Derivative | 13 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 |

Aerated deposit onto a baking surface and bake in the usual manner.

EXAMPLE 12

Chocolate Chip Cookies. Chocolate chip cookies may be prepared using the butterscotch cookie recipe of Example 10, but not substituting

| Ingredient | parts |
| --- | --- |
| Example 8 Margarine | 10.0 |
| Example 1 Amino Acid Derivative or the fat mimetic ingredient, | 10.0 |
| Granulated Sugar | 15.0 |
| Brown Sugar | 15.0 |
| for the sugar, and | |
| Example 6 Chocolate Chips | 19.0 | for the butterscotch bits.

EXAMPLE 13

Filled Cream. To make a "filled cream" composition, homogenize about

| Ingredient | parts |
| --- | --- |
| Example 1 Amino Acid Derivative | 30 |
| Skim Milk | 69.9 |
| Polysorbate 80 | 0.1 | in a conventional dairy homogenizer.

EXAMPLE 14

Ice Cream. Vanilla ice cream may be prepared by mixing

| Ingredient | parts |
| --- | --- |
| Sugar (10X) | 15.0 |
| Nonfat Dry Milk | 3.9 |
| Salt | 0.4 |
| into Water | 39.0 |
| for 3 minutes. Then add melted | |
| Example 2 Amino Acid Derivative | 28.4 |
| and cook to 200° F while mixing. Hold for 1 minute. Cool to 160° F., and add | |
| Sugared Egg Yolks | 12.5 |
| Vanilla Extract | 0.8 | and mix 1 minute. Cool and freeze to desired overrun.

EXAMPLE 15

Filled Milk. To prepare a "filled milk" composition, combine about

| Ingredient | parts |
| --- | --- |
| Example 13 Filled Cream | 100 |
| Skim Milk | 900 | and rehomogenize.

EXAMPLE 16

Cheese Products. To prepare cheese products, treat

| Ingredient | parts |
| --- | --- |

Example 15 Filled Milk made with a 1:1 mixture of Examples 1 and 2 amino acid derivatives is used like natural milk in the normal cheese making process (as is practiced, for example in the production of Cheddar or Swiss cheese). Preferably add -continued

| Ingredient | parts |
| --- | --- |
| Butter Oil | 10 | to the fat mimetic portion of the filled milk product before it is employed in this process to enhance the proper flavor development of the cheese products.

EXAMPLE 17

Butter Cream Frosting. Butter cream frosting may be prepared by blending:

| Ingredient | parts |
| --- | --- |
| Sugar | 227.0 |
| Example 3 Amino Acid Derivative | 70.8 |
| Water | 28.4 |
| Non-Fat Dry Milk | 14.0 |
| Emulsifier | 1.4 |
| Salt | 1.0 |
| Vanilla | 1.0 |

All of the ingredients are creamed in a mixer at medium speed.

EXAMPLE 18

Crackers. A dough prepared by mixing together

| Ingredient | parts |
| --- | --- |
| Flour | 100 |
| Sugar | 5.0 |
| Malt | 1.5 |
| Example 4 Amino Acid Derivative | 7.5 |
| Salt | 1.0 |
| Sodium Bicarbonate | 0.9 |
| Nonfat Dry Milk | 2.5 |
| High Fructose Corn Syrup | 2.5 |
| Monocalcium Phosphate | 0.75 |
| Water | 28 | is sheeted, stamped, and baked to produce a cracker product.

EXAMPLE 19

Sprayed Crackers. The sheeted and stamped cracker dough of Example 16 may be sprayed with the amino acid derivative of Example 1 after baking.

EXAMPLE 20

Mayonnaise. Mayonnaise can be prepared by adding

| Ingredient | parts |
| --- | --- |
| Water | 5.0 |
| to Sugar | 1.5 |
| and Spices | 3.5 |
| and mixing three minutes. To this is added | |
| Salted Egg Yolks | 8.0 |
| followed by mixing two minutes, and adding | |
| Example 1 Amino Acid Derivative | 40 |
| Corn Oil | 40 |
| then 120 Distilled Vinegar | 2.0 |

The mixture is blended 3 minutes and passed through a colloid mill set at 60 prior to filling in the usual process.

EXAMPLE 21

Pudding. Pudding can be prepared from the following formulation:

| Ingredient | parts |
| --- | --- |
| Milk | 67 |
| Sugar | 11 |
| Starch | 5 |
| Water | 9 |
| Flavor | 3 |
| Example 3 Amino Acid Derivative | 5 |

The ingredients can be blended together and heated to form a pudding.

EXAMPLE 22

Frying oil. The amino acid derivative of Example 2 with 1 ppm polydimethylsiloxane may be used for frying food snacks. For frying potatoes, omit the polydimethylsiloxane.

EXAMPLE 23

Frying oil. Another frying oil may be prepared by mixing one part peanut oil with one part frying oil of Example 22.

EXAMPLE 24

Pet Food. Dry, expanded animal food kibs may be prepared from the following ingredients:

| Ingredient | parts |
| --- | --- |
| Hominy Feed | 37 |
| 52% Meat Meal | 17 |
| Wheat Shorts | 13 |
| Example 4 Amino Acid Derivative | 16 |
| Corn Germ Meal | 9.6 |
| Wheat Germ Meal | 3 |
| Dried Milk | 0.9 |
| Beet Pulp | 1.7 |
| Fish Scrap | 0.5 |
| Brewer's Yeast | 0.5 |
| Salt | 0.5 |
| Vitamins and Minerals | 0.1 |

The ingredients are mixed together and water added to raise the water content to 27%, before extrusion, pelleting, and drying in the usual manner.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. An edible composition having a fat ingredient, wherein at least 5% of said fat ingredient comprises an amino acid fat mimetic derivative of the formula

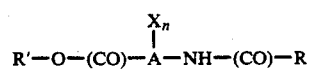

where
A = a hydrocarbyl group having 1 to 6 carbons,

X = a free or acylated amino acid side chain having 1 to 25 carbons, n = 0 or 1, each R is, independently, a $C_1$ to $C_{29}$ aliphatic group, a $C_2$ to $C_{29}$ ester group of the formula R''—O—R'''—, or a $C_2$ to $C_{29}$ ester group of the formula R'''—O—(CO)— R''— or R''—(CO)—O—R'''—, where R''— and R'''— are, independently, aliphatic groups, and each R' is, independently, a $C_1$ to $C_{30}$ aliphatic group, a $C_2$ to $C_{30}$ ester group of the formula R''—O—R'''—, or a $C_2$ to $C_{30}$ ester group of the formula R'''—O—(CO)— R''— or R''—(CO)—O—R'''—, where R''— and R'''— are, independently, aliphatic groups.

2. A composition according to claim 1 wherein said R and R' are aliphatic groups.

3. A composition according to claim 2 wherein said amino acid fat mimetic derivative is described by the formula

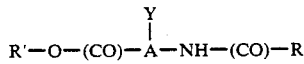

where

Y is $C_1$ to $C_{25}$ aliphatic group.

4. A composition according to claim 2 wherein said amino acid fat mimetic derivative is described by the formula

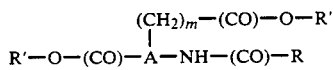

where m = 0 to 9.

5. A composition according to claim 2 wherein said amino acid fat mimetic derivative is described by the formula

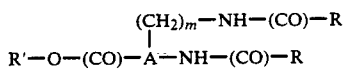

where m = 0 to 9.

6. A composition according to claim 2 wherein said amino acid fat mimetic derivative is described by the formula

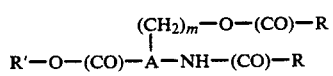

where m = 0 to 9.

7. A composition according to claim 1 wherein said edible composition is a bakery product and further comprises flour or starch.

8. A composition according to claim 1 wherein said edible composition is a candy and further comprises a sweetener.

9. A composition according to claim 1 wherein said edible composition is an emulsion comprising an aqueous phase and a fat phase including the fat mimetic.

10. A composition according to claim 1 which further comprises a fat replacement selected from the group consisting of sucrose polyester and a proteinaceous fat replacement.

11. In a food composition having a fat ingredient, an improvement wherein at least 20% of said fat ingredient is replaced by a fatty acid acylated, fatty alcohol esterified amino acid selected from the group consisting of aspartic acid, glutamic acid, lysine, argininie, histidine, ornithine, tyrosine, cysteine, asparatgine, glutamine, serine, threonine, glycine, alanine, valine, leucine, isolenucine, methionine, proline, phenylalanine, and tryptophan.

12. An improvement according to claim 11 wherein said fatty acid acylated, fatty alcohol esterified amino acid is selected from the group consisting of aspartic acid, glutamic acid, lysine, ornithine, serine, and threonine.

13. An improvement according to claim 12 wherein said fatty acid acylated, fatty alcohol esterified amino acid is an aspartic acid or a glutamic acid derivative.

14. An improvement according to claim 13 wherein said fatty acid acylated, fatty alcohol esterified amino acid is a N-acylated aspartic acid diester, said acyl groups having 3 to 23 carbons and said ester groups having 4 to 24 carbons.

15. An improvement according to claim 11 wherein said fat ingredient is at least 25 replaced by said fatty acid acylated, fatty alcohol esterified amino acid.

16. A method for reducing the available calories in a food composition having a fat component, which method consists of replacing at least a portion of the fat component with an amino acid fat mimetic compound of the formula

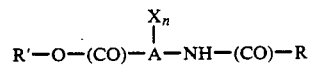

where

A = a hydrocarbyl group having 1 to 6 carbons,

X = a free or acylated amino acid side chain having 1 to 25 carbons, n = 0 or 1, each R is, independently, a $C_1$ to $C_{29}$ aliphatic group, a $C_2$ to $C_{29}$ ester group of the formula R''—O—R'''—, or a $C_2$ to $C_{29}$ ester group of the formula R'''—O—(CO)— R''— or R''—(CO)—O—R'''—, where R''— and R'''— are, independently, aliphatic groups, and each R' is, independently, a $C_1$ to $C_{30}$ aliphatic group, a $C_2$ to $C_{30}$ ester group of the formula R''—O—R'''—, or a $C_2$ to $C_{30}$ ester group of the formula R'''—O—(CO)— R''— or R''—(CO)—O—R'''—, where R''— and R'''— are, independently, aliphatic groups.

17. A method according to claim 16 wherein the R groups are $C_3$ to $C_{23}$ aliphatic groups and the R' groups are $C_4$ to $C_{24}$ aliphatic groups.

18. A method according to claim 16 wherein n = 1.

19. A method according to claim 17 wherein said amino acid fat mimetic delivers 0.5 to 3.0 kcal/gram upon being metabolized.

20. A method according to claim 16 wherein said amino acid fat mimetic derivative is described by the formula

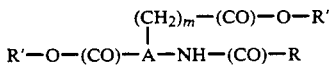

where
m=0 to 9,
R is an aliphatic group having 1 to 29 carbons, and
R' is an aliphatic group having 1 to 30 carbons.

21. A method according to claim 17 wherein said amino acid fat mimetic is derived from an amino acid selected from the group consisting of aspartic acid, glutamic acid, lysine, ornithine, serine, and threonine.

22. A method according to claim 21 wherein said amino acid is selected from the group consisting of aspartic acid and glutamic acid.

23. An edible composition having a fat ingredient wherein at least part of said fat ingredient is replaced by a $C_3$ to $C_{23}$ fatty acid N-acylated aspartic acid $C_4$ to $C_{24}$ fatty alcohol diester.

* * * * *